A. W. OLSON.
AUXILIARY SEAT FOR BABY CARRIAGES.
APPLICATION FILED AUG. 19, 1920.
1,372,538.
Patented Mar. 22, 1921.
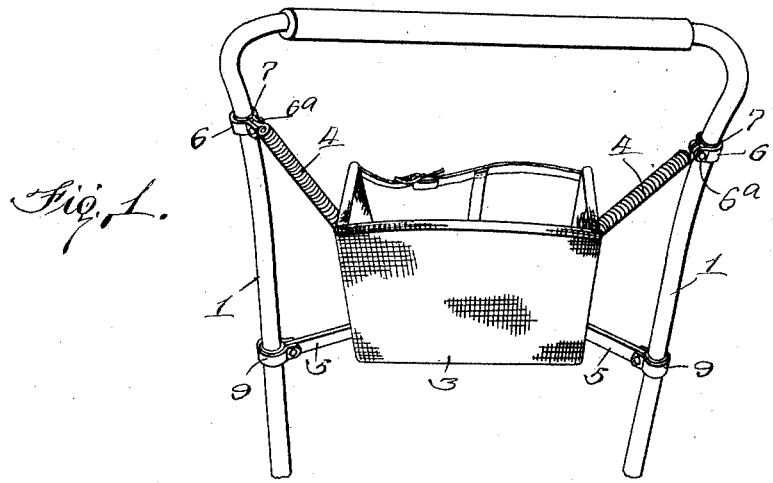
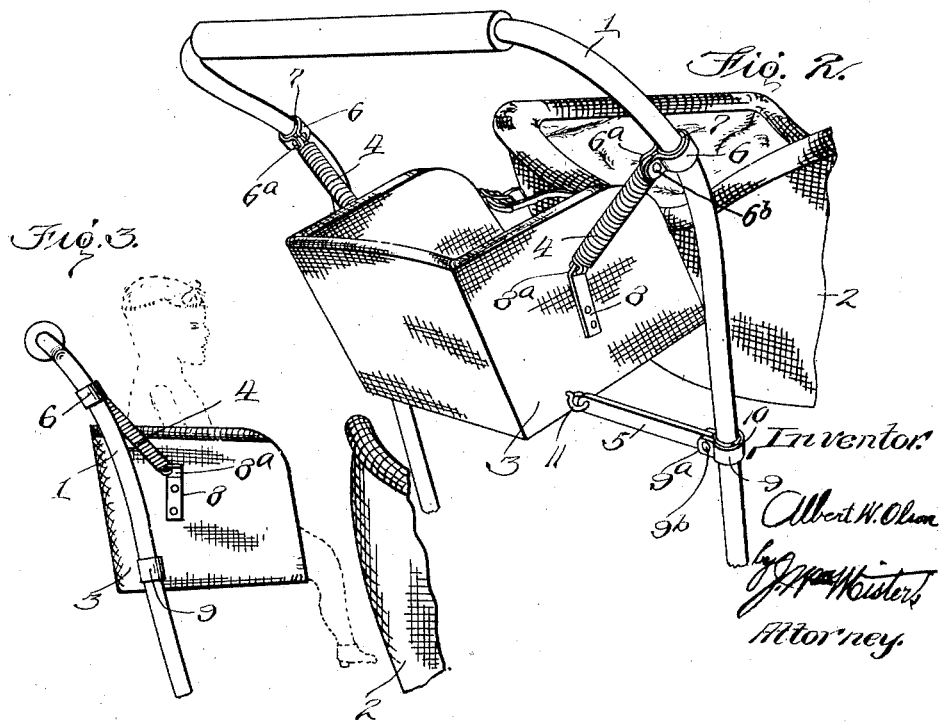

UNITED STATES PATENT OFFICE.

ALBERT W. OLSON, OF CHICAGO, ILLINOIS.

AUXILIARY SEAT FOR BABY-CARRIAGES.

1,372,538.  Specification of Letters Patent.  Patented Mar. 22, 1921.

Application filed August 19, 1920. Serial No. 404,522.

*To all whom it may concern:*

Be it known that I, ALBERT W. OLSON, being an applicant for citizenship of the United States, citizen or subject of Sweden, residing at Chicago, in the county of Cook and State of Illinois, have invented certain new and useful Improvements in Auxiliary Seats for Baby-Carriages, of which the following is a specification.

This invention relates to improvements in wheeled vehicles or carriages, particularly baby-carriages.

The invention has for its object to provide for increasing the accommodating or carrying facilities of the vehicle or carriage and to carry out these ends in a simple, economical and effective manner.

The invention therefore consists of certain instrumentalities and features of construction substantially as hereinafter more fully set forth and defined by the appended claims.

The accompanying drawing illustrates the preferred embodiment or one form of my invention wherein it will be understood that various changes and modifications as relate to the detailed construction and arrangement of parts may be made without departing from the spirit or scope of the invention as embraced in the claims, and in which drawing—

Figure 1 illustrates a rear elevation of a portion of a baby-carriage showing my invention applied thereto.

Fig. 2 is a perspective view of the same, showing fragmentally, the usual carriage seat.

Fig. 3 is a side view of the auxiliary seat disconnected from the primary seat.

As characteristic features of my invention, as disclosed by the drawing, I provide for suspending from the handle-forming members 1 of a carriage 2, preferably of the "baby" type, an auxiliary seat 3, preferably of like material as that of the body of the carriage, as shown, thus providing for increased seating capacity of the carriage, as is apparent, two occupants being accommodated, whereby previously only a single one could be, without enlarging the carriage dimensions.

The means for effecting such suspension or attachment of the auxiliary seat from the carriage handle-forming members, include oppositely arranged resilient members 4, comprising preferably compactly coiled or helical springs, inflexible preferably flat metal links or bars 5. The springs or resilient members 4 are looped or hooked at their outer terminals between opposed spaced lips or terminals $6^a$ of clips 6, over rivets $6^b$ passed through said lips or terminals, said clips being clamped upon the handle forming members, with packings or rings 7 interposed between said clips and said handle-forming members, firmly gripping the latter. The opposite or inner ends of the springs 4 are looped or hooked into outwardly bent or deflected upper ends of bracket 8 as at $8^a$ preferably riveted or otherwise secured to the sides of the auxiliary seat 3. The flat metal bars or links 5 are similarly connected to the handle-forming members 1, by clips 9, having lips $9^a$, and by rivets $9^b$ inserted through said lips and through the outer ends of said bars or links; packing rings 10 being interposed between said handle forming members and said clips, said bars or links, however, being allowed to pivot upon pivot-forming rivets $9^b$ to conform to the gentle up and down oscillatory movement of the auxiliary seat. The opposite ends of the bars or links 5 also have a like movable or pivotal connection with the auxiliary seat for the same purpose, said links or bars having preferably end-looped bolt or other suitable connections 11, with the sides of said auxiliary seat, near the bottom edge thereof, as clearly shown. These inflexible links or members function to retain the auxiliary seat in a relatively stationary intermediary position with respect to the carriage and the hand-bar of the handle-forming members, as shown, the resilient structure providing for increasing the seating capacity of the carriage in an extremely simple, unique, effective and inexpensive manner.

I claim and desire to secure by Letters Patent:—

1. A vehicle, including an auxiliary seat hung between, and spaced from the lateral members of the handle of the main-seating-member, resilient connection between said auxiliary seat and the lateral members of said handle, and rigid members between said handle-lateral members and the sides of said auxiliary seat, said resilient connections retained or sustained in an inclined relation with respect to the handle-members and the auxiliary seat, said rigid members having pivotal connections with the auxiliary seat and handle lateral members.

2. A vehicle including an auxiliary seat hung between, and spaced from the lateral members of the handle of the main-seating member, resilient connections between said auxiliary seat and the lateral members of said handle, comprising compactly coiled springs, the ends of which are secured by frictionally retained means and brackets having inclined terminals, to the lateral members of said handle and the sides of the auxiliary seat, respectively, and rigid members between said handle lateral members and the sides of said auxiliary seat, the ends of said rigid members being secured by frictionally-retained means and eye-ended fastenings to said handle and auxiliary seat, respectively, said resilient connections retained or sustained in an inclined relation with respect to the handle-members and the auxiliary seat, said end-retaining means and brackets having limited pivotal movement.

In testimony whereof I affix my signature.

ALBERT W. OLSON.